A. L. MUNRO

VIBRATORY SCREEN

July 19, 1932.

Re. 18,530

Original Filed Sept. 7, 1928

2 Sheets-Sheet 1

INVENTOR.

Alexander L. Munro.

BY

Morsell, Keeney & Morsell,

ATTORNEYS.

A. L. MUNRO

VIBRATORY SCREEN

July 19, 1932.

Re. 18,530

Original Filed Sept. 7, 1928

2 Sheets-Sheet 2

INVENTOR.

Alexander L. Munro.

BY

Morsell, Kenney & Morsell,

ATTORNEYS.

Reissued July 19, 1932

Re. 18,530

UNITED STATES PATENT OFFICE

ALEXANDER L. MUNRO, OF MILWAUKEE, WISCONSIN, ASSIGNOR TO SMITH ENGINEERING WORKS, OF MILWAUKEE, WISCONSIN, A CORPORATION OF WISCONSIN

VIBRATORY SCREEN

Original No. 1,730,435, dated October 8, 1929, Serial No. 304,404, filed September 7, 1928. Application for reissue filed April 25, 1931. Serial No. 532,966.

This invention relates to improvements in vibratory screens, more particularly, although not solely, adapted for screening crushed stone, gravel, etc.

It is one of the objects of the present invention to provide a vibratory screen in which the movements of two or more screens are balanced against each other to reduce the strain on the respective parts.

A further object of the invention is to provide a vibratory screen in which the respective decks are vibrated by independent eccentrics in opposite relation to each other.

A further object of the invention is to provide a vibratory screen in which the end portions of the screens are yieldingly and pivotally supported at their opposite ends in a manner to permit the bodily movement of the screens both vertically and horizontally.

A further object of the invention is to provide a vibratory screen which is of simple construction, is strong and durable, and is well adapted for the purpose described.

With the above and other objects in view, the invention consists of the improved vibrating screen and its parts and combinations as set forth in the claims, and all equivalents thereof.

In the accompanying drawings in which the same reference characters indicate the same parts in all of the views.

Figure 1:
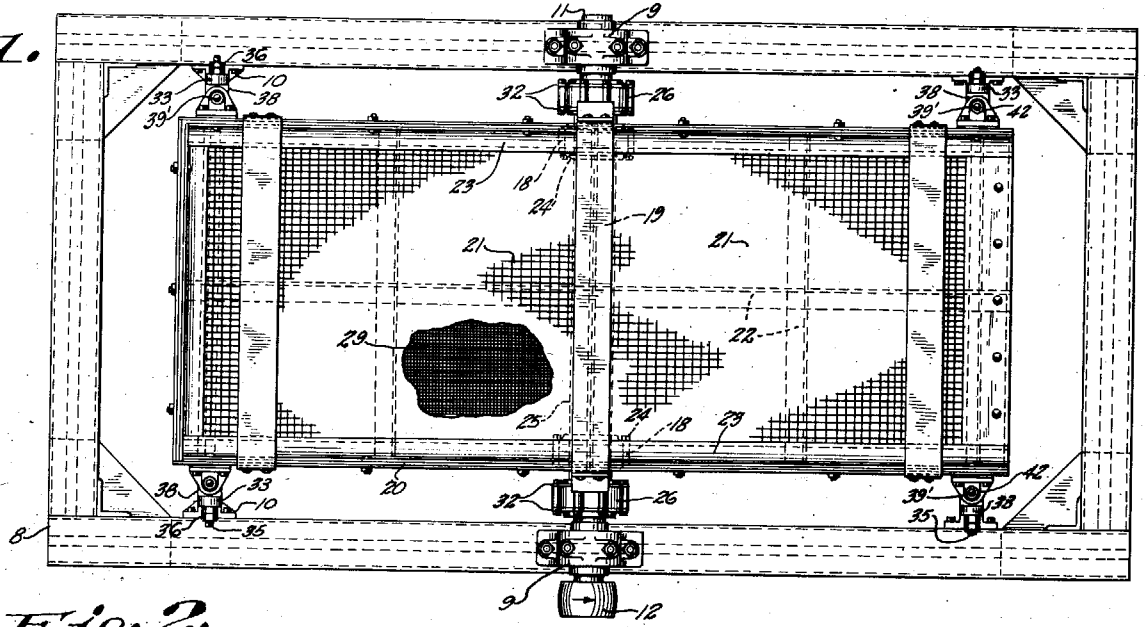
Fig. 1 is a top view of the improved vibratory screen, parts being broken away to show parts therebeneath.
Figure 2:
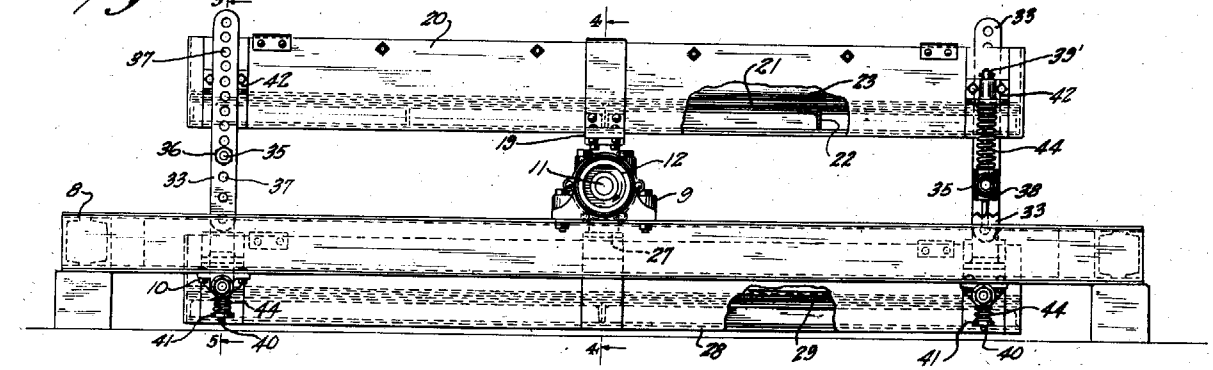
Fig. 2 is a side view thereof, parts broken away.
Figure 3:
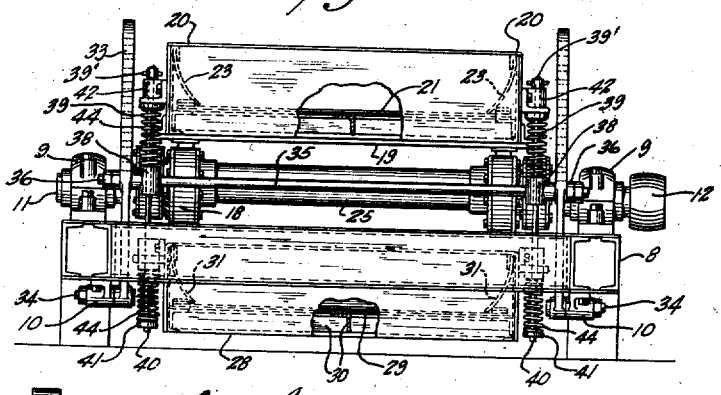
Fig. 3 is an end view of the machine, parts broken away.
Figure 4:
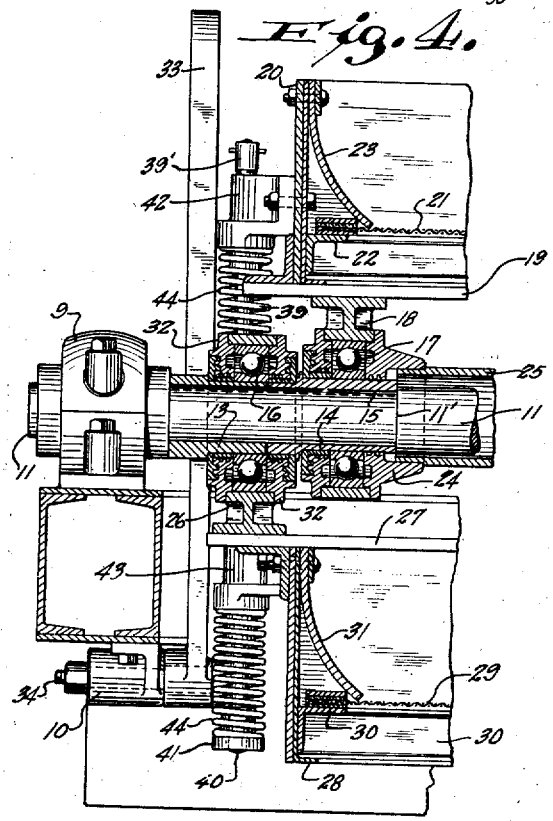
Fig. 4 is a transverse vertical sectional detail view on a larger scale and taken on line 4—4 of Fig. 2.
Figure 5:
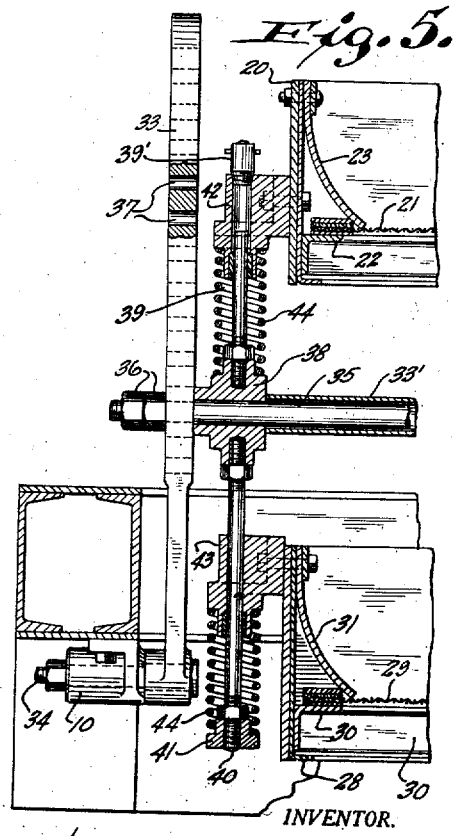
Fig. 5 is a similar view taken on line 5—5 of Fig. 2.

Referring to the drawings, the numeral 8 indicates a frame or support of rectangular formation upon which are mounted central upper bearings 9 and lower front and rear end brackets 10. A main drive shaft 11 extending transversely across the frame 8 is journaled in the bearings 9 and at one of its end portions is provided with a pulley 12 for driving connection with a source of power. Opposite end portions of the shaft between the bearings 9 have mounted fast thereon pairs of eccentric sleeves 13 and 14 held in position by keys 15. The eccentric sleeves of each pair are offset on the shaft 11 diametrically opposite each other and the inner ends of the sleeves 14 abut against shoulders 11′, while the outer ends of the outer sleeves 13 abut against the bearing 9.

Ball bearings 16 and 17 extend around the eccentric sleeves, and the inner bearings 17 have bearing sleeves 18 which surround the ball bearings 17 and are mounted beneath a central transverse member 19 forming part of the upper screen frame 20. Said frame is of rectangular form and is provided with removable screen sections 21. Transversely and longitudinally extending angle bars 22 forming part of the frame and upon which the screens rest serve to reinforce the frame and the screens.

The inner opposite side portions of the frame are provided with removable inclined or curved guards 23 which are secured at their upper edges to the frame and extend downwardly and inwardly over the side edge portions of the screens to deflect the material to be screened directly upon the screens.

Portions of the inner ball bearing casings 24 extend inwardly towards each other to receive the opposite ends of a tube 25 which extends around and protects the shaft 11. The bore of the tube is of larger diameter than the shaft 11 to permit the eccentric movement of the ball casing and the tube with relation to the shaft. Said casings 24 extend on opposite sides of the bearing sleeves 18 and hold the parts in alined position.

The outer ball bearings 16 are also provided with bearing sleeves 26 which surround the ball bearings 16 and are mounted on a central transverse member 27 forming part of the lower screen frame 28. Said lower screen frame is also of rectangular form and is provided with removable screen sections 29 which may be easily removed and screens of a different mesh submitted. Transversely and longitudinally extending angle bars 30 forming part of the frame 28 and upon which the screens 29 rest, serve to reinforce the frame and the screens in providing intermediate supports for the screens between the main members of the frame.

The inner side portions of the lower frame are provided with removable inclined or curved guards 31 which are secured at their upper edges to the side portions of the frame and extend downwardly and inwardly over the side edge portions of the lower screens to deflect on the lower screens the material screened from the upper and coarser mesh screens. The guard members 23 and 31 may be formed of rubber, metal or other material, as desired.

The casings 32 surrounding the outer ball bearings extend on opposite sides of the bearing sleeves 26 and hold said parts in position with relation to the other parts.

Links 33 connected to pivot bolts or pins 34, which project through the front lower and rear brackets 10, extend upwardly on opposite sides of both ends of the screen frames and are adjustably connected together by transverse rods 35. The opposite ends of the rods are threaded to receive nuts 36 to secure the rods to the links and said links are each provided with a series of rod openings 37 to vertically adjust the position of said rods with relation to the links for reasons to be later described.

Brackets 38 pivotally mounted on the transverse rods 35 and bearing against the inner sides of the links 33 have upwardly and downwardly projecting rod extensions 39 and 40, and the extensions 40 are provided with nuts 41 on their lower ends. The rods 39 extend partly through bearing brackets 42 mounted on the opposite side portions of screen frame 20, while the rods 40 extend downwardly through brackets 43 mounted on the opposite sides of the screen frame 28, and sleeves 33′ surrounding the rods 35 are interposed between the brackets to hold said brackets in position. Coiled springs 44 surrounding the respective rod extensions 39 and 40 are interposed between the brackets 42 and 38 and between the brackets 43 and the nuts 41, so that the forward and rearward end portions of the screen frame are yieldingly supported upon the rod extensions 39 and 40 and said rods are pivotally connected to the links, and the links in turn are pivotally connected to the frame or support. The upper brackets 42 are provided with grease supply fittings 39′ for lubricating said rods 39. As thus connected the screen frames are maintained and supported in relative position and are permitted to be oppositely vibrated in horizontal and vertical directions to correspond with the opposite movements imparted to the screen frames by the eccentric members. The forward and rearward connections as just described permit the adjustment of the downward inclination of the screen frame to discharge the pieces of material too large to pass through the meshes of the screens by changing the transverse rod from one pair of openings 37 in the links 33 to another pair.

In use the screen frames are adjusted to the desired inclination and the central shaft is rotated to vibrate the screens in diametrically opposite directions throughout all portions of their movements. As thus operated the screen movements oppose or counterbalance each other and thus eliminate excessive wear of the parts. When rotated the material, crushed stone for instance, is fed onto the upper screen and the pieces of less size than the openings of the mesh will pass therethrough and drop to the lower screen while the larger pieces will be discharged from the rear end of the upper screen and taken care of in any manner desired. The screened stone dropped on the lower screen of smaller mesh will be again screened and the smaller pieces will pass through the lower screen while the larger pieces will be discharged from the rear end, thus providing for separating the three sizes of stone or other material from each other. It will also be noted that the true circular movement of the screen members and the direction of rotation will cause the material resting on the screens to be advanced towards the discharge end of the screen and thus spread the material over the screen in working it towards the discharge end and thus permit the smaller pieces to drop through the meshes of the screen.

It is to be understood that other screen frames may be mounted on the extension rods to provide a vibratory screen having a greater number of screen decks if desired.

From the foregoing description it will be seen that the vibratory screen is of very simple construction and is well adapted for the purpose described.

What I claim as my invention is:

1. A vibratory screen, comprising a support, an upper and a lower screen member positioned adjacent the support, a shaft journaled on the support and having connections with the screen members for vibrating said members in opposite directions with relation to each other, means yieldingly and pivotally connecting the screen members together and pivotally connecting the said members to the support, and means for rotating the shaft.

2. A vibratory screen, comprising a support, a transverse shaft journaled thereon and having eccentrics extending in opposite directions, an upper screen member journaled on one of the eccentrics, a lower screen member journaled on the other eccentric, means for pivotally connecting the screen members together at one end portion and to the support, and means for rotating the shaft to vibrate the screen members in opposite directions with relation to each other.

3. A vibratory screen, comprising a support, a transverse shaft journaled thereon and having spaced eccentrics, the eccentrics extending in opposite directions, an upper screen member journaled on one of the eccentrics, a lower screen member journaled on the other eccentric, means for pivotally connecting the screen members together at one end portion and to the support for maintaining the screen members approximately in parallel relation to each other, and means for rotating the shaft to vibrate the screen members in opposite directions with relation to each other.

4. A vibratory screen, comprising a support, a transverse shaft journaled thereon and having spaced pairs of eccentrics, the eccentrics of each pair extending in opposite directions, an upper rectangular-shaped screen member journaled on one of the like eccentrics of each pair, a lower screen member journaled on the other eccentric of each pair of eccentrics, means for pivotally connecting the screen members together at one end portion and to the support, and means for rotating the shaft to vibrate the screen members both vertically and horizontally in opposite directions with relation to each other.

5. A vibrating screen, comprising a support, a transverse shaft journaled thereon and having spaced pairs of eccentrics, the eccentrics of each pair extending in opposite directions, an upper screen member journaled on one of the like eccentrics of each pair, a lower screen member journaled on the other eccentric of each pair of eccentrics, links pivotally connected to the support and extending upwardly on opposite sides of the screen members and adjacent end portions thereof, bracket members pivotally connected to the links and provided with extensions having sliding connections with the screen members, yielding means interposed between the connections and the extensions, means pivotally and yieldingly connecting the opposite end portions of the screen members together, and means for rotating the shaft.

6. A vibratory screen, comprising a support, a transverse shaft journaled thereon and having spaced pairs of eccentrics, the eccentrics of each pair extending radially in opposite directions, an upper screen member journaled on one of the like eccentrics of each pair, a lower screen member journaled on the other eccentric of each pair of eccentrics, links pivotally connected to the support and extending upwardly on opposite sides of the screen members at adjacent end portions, a transverse rod connecting the two links together, brackets journaled on said rod and provided with extensions projecting upwardly and downwardly alongside of the screen members, bearing brackets mounted on the opposite sides of the screen members and slidably engaging the extensions, coiled springs surrounding the extensions and interposed between the upper bearing brackets and the rod brackets and between the lower bearing brackets and nuts mounted on the lower ends of the lower extension, bearing brackets mounted on the opposite side end portions of the screen frames adjacent the links, bracket members having upwardly and downwardly projecting extensions which slidably extend through the bracket members to connect the screen members together, springs on said extensions and engaged by the bearing brackets, and means for rotating the shaft.

7. A vibratory screen, comprising a support, a transverse shaft journaled thereon, spaced links pivotally connected to one end portion of the support, screen members positioned above and below the shaft and pivotally and yieldingly connected to the links at one end portion, means yieldingly and pivotally connecting the opposite ends of the screen members together, spaced pairs of eccentrics mounted on the shaft, the eccentrics of each pair extending radially in opposite directions, bearings connecting the screen members to the eccentrics in pairs to vibrate the screen members in opposite directions both vertically and horizontally, and means for rotating the transverse shaft.

8. A vibratory screen, comprising a support, a transverse shaft journaled thereon, spaced links pivotally connected to one end portion of the support, screen members positioned above and below the shaft and pivotally and yieldingly connected to the links at one end portion, said pivotal and yielding connection being adjustable to adjust the inclination of the screen members, means yieldingly and pivotally connecting the opposite ends of the screen members together, spaced pairs of eccentrics mounted on the shaft, the eccentrics of each pair extending radially in opposite directions, bearings connecting the screen members to the eccentrics in pairs to vibrate the screen members in opposite directions both vertically and horizontally, and means for rotating the transverse shaft.

9. A vibratory screen comprising, a support, upper and lower screen members positioned adjacent said support, a shaft journaled on said support and connected to said screen members mid-way between the ends thereof to vibrate the same in opposite directions relative to each other, means for rotating said shaft, and yielding means coacting with said screen members on opposite sides of and remote from said shaft.

10. A vibratory screen comprising, a support, upper and lower screen members positioned adjacent said support, a shaft journaled on said support and connected to said screen members mid-way between the ends thereof to vibrate the same in opposite directions relative to each other, means for rotating said shaft, means pivotally connecting portions of said screen members remote from said shaft to said support, and yielding means coacting with said screen members adjacent said pivotal connecting means.

11. A vibratory screen comprising, a support, upper and lower screen members positioned adjacent said support, a shaft journaled on said support and connected to medial portions of said screen members to vibrate said members in opposite directions relative to each other and to balance the weight thereof upon said shaft, means for rotating said shaft, and yielding means coacting with end portions of said screen members.

12. A vibratory screen comprising, a support, upper and lower screen members positioned adjacent said support, a shaft journaled on said support and connected to said screen members mid-way between the ends thereof to vibrate the same in opposite directions relative to each other, means for rotating said shaft, means pivotally connecting said screen members to said support remote from said shaft, and yielding means coacting with said screen members on opposite sides of said shaft.

13. A vibratory screen comprising, a support, upper and lower screen members positioned adjacent said support, a shaft journaled on said support and connected to said screen members mid-way between the ends thereof to vibrate the same in opposite directions relative to each other, means for rotating said shaft, means pivotally connecting said screen members to said support remote from said shaft, and other means yieldingly engaging said screen members remote from said shaft.

14. A vibratory screen comprising, a support, upper and lower screen members positioned adjacent said support, a shaft journaled on said support and connected to said screen members mid-way between the ends thereof to vibrate the same in opposite directions relative to each other, means for rotating said shaft, yielding means coacting with said screen members remote from said shaft, and means for varying the angularity of said screen members relative to said support.

15. A vibratory screen comprising, a support, upper and lower screen members positioned adjacent said support, a shaft journaled on said support and connected to said screen members mid-way between the ends thereof to vibrate the same in opposite directions relative to each other, means for rotating said shaft, means pivotally connecting said screen members to said support remote from said shaft, and means for varying the angularly of said screen members relative to said support.

In testimony whereof, I affix my signature.

ALEXANDER L. MUNRO.